United States Patent [19]

Wake

[11] Patent Number: 4,958,272
[45] Date of Patent: Sep. 18, 1990

[54] APPARATUS AND SYSTEM FOR GENERATING SMOOTH SHADED CONTINUOUS TONE IMAGES

[75] Inventor: Warren K. Wake, Nashua, N.H.

[73] Assignee: Xyvision Design Systems, Inc., Wakefield, Mass.

[21] Appl. No.: 157,457

[22] Filed: Feb. 17, 1988

[51] Int. Cl.⁵ ............................................. G06F 15/62
[52] U.S. Cl. ...................................... 364/518; 364/521
[58] Field of Search ............... 364/521, 522; 340/728, 340/729

[56] References Cited

U.S. PATENT DOCUMENTS 3,996,673 12/1976 Vorst et al. ...................... 364/521 X
4,609,917 9/1986 Shen ................................... 340/729
4,727,364 2/1988 Vorst ................................. 340/729

Primary Examiner—Gary V. Harkcom
Assistant Examiner—Mark K. Zimmerman
Attorney, Agent, or Firm—Hopgood, Calimafde, Kalil, Blaustein & Judlowe

[57] ABSTRACT

An apparatus and system for generating smooth shaded continuous tone images based on user selected curve constraints that define the color intensity level transition in the image. The curve constraints define an intensity surface for each selected color. These surfaces are mapped, pixel by pixel onto a two-dimensional matrix array. The image generated from this two-dimensional matrix array can be stored, modified transmitted, displayed, or printed.

16 Claims, 12 Drawing Sheets

APPARATUS AND SYSTEM FOR GENERATING SMOOTH SHADED CONTINUOUS TONE IMAGES

BACKGROUND OF THE INVENTION

The present invention generally relates to an apparatus and system for the production of smooth shaded continuous tone planar images. More specifically, the present invention relates to a program controlled computer system capable of interactive production of user-variable smooth shade planar images incorporating various user-constructed degrade patterns within the planar image.

In the context of the present invention, a smooth shaded continuous tone image comprises at least two spatially discrete and distinctly shaded (or colored) regions separated by a region of transition between the different shades. This transition region is referred to as the "degrade" of the continuous tone planar image and forms a zone of gradual change from one shade to the other. While the following discussion will address various aspects of image "shading", it should be recognized that the same concepts are equally applicable in a multi-color image format.

The planar images as described above play an important role in the Graphic Arts field. These images are characterized by gradually changing shades that are spatially arranged, and more importantly, the absence of sharp breaks or borders in the image. This type of planar image is an ideal background for a more complex, central figure. More specifically, when a graphic artist displays an item having certain commercial or aesthetic attributes, he requires a background that does not distract attention away from the displayed item. The degrade pattern, as background, tends to highlight the central item of the composite rendering in an aesthetically pleasing manner, while focusing the observer's attention onto the central item.

A specific example of such a use exists in the product packaging industry. In this context, the package containing the product will often carry a pictorial representation of the enclosed product on an exposed surface. To draw attention to the pictured product, the entire rendering will include a background with a degrade pattern converging on the central product image. This background becomes a key component in the overall impression desired by the graphic artist, and therefore a suitably large effort is expended in its preparation.

In the past, degrade patterns were created by mechanical application of the desired pattern onto a print receiving surface. One mechanical applicator often used is an "air brush", which operates as an atomizer for applying a fine mist of paint spray, propelled by compressed air. The air brush, when properly used, is capable of rendering a degrade with many different degrees of transition and a variety of shading colors and locations. The fundamental drawback of the air brush lies in its need for a highly skilled operator or artist and a large amount of time-consuming manual manipulation. In addition, once a degrade pattern is formed by an air brush, minor changes to the pattern are extremely difficult, thus requiring the artist to often submit a marginally acceptable pattern or to start over and produce an entirely new degrade pattern.

It was with this understanding of the problems and drawbacks with the prior art that the present invention was made.

OBJECTS AND SUMMARY OF THE INVENTION

An object of the present invention is to provide an interactive system for the generation of smooth shaded continuous tone images that is capable of generating a variety of degrade patterns in a simplified and expeditious manner.

Another object of the present invention is to provide an apparatus capable of generating a smooth shaded continuous tone image that, once generated, can be easily modified or up-dated, by direct user interaction with the system.

Yet another object of the present invention is to provide a system for the generation of degrade patterns in a two-dimensional (planar) image in both black and white and multi-color formats.

The above and other objects of the present invention are realized in a system for effecting smooth shaded continuous tone images. A program controlled digital computer provides user interactive control of a two-dimensional image array. The computer interface accepts user selectable variables for establishing the desired parameters of the degrade pattern. Once these parameters are set, a curve fitting algorithm provides color/shading assignments on a pixel by pixel basis in the two-dimensional matrix array, thus creating a digital representation of a smooth shaded continuous tone image. The resulting image can be completely redone, up-dated, stored, transmitted and ultimately printed onto hard copy as a package design, or the background of a more complex image.

DETAILED DESCRIPTION OF THE INVENTION

The system of the present invention employs a digital computer in combination with specific instruction sets to generate the desired degrade pattern. Through the use of this system in a user-interactive manner, a final degrade pattern is formed and stored as a two-dimensional array of image elements or pixels. Each pixel has a location in the planar image matrix, represented in terms of cartesian (X, Y) coordinates. In addition, each pixel is assigned a color intensity value (I) that defines the level of color intensity for each color available at that particular pixel location. The two-dimensional image, collectively represented by the intensity values for each color at each pixel location, provides the output for generating the desired degrade pattern. The output is used in per se well known commercial pre-press systems (e.g., SciTex) for the generation of separation films for ultimate use in a multi-color graphic print system. The process for generating this two-dimensional image array is explained below.

Figure 1:
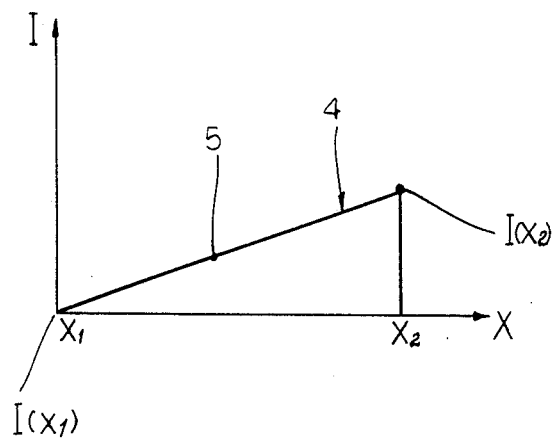
FIG. 1 provides a two-dimensional curve plot showing the relationship between color intensity (I) and horizontal position (X).

By way of brief overall philosophy, refer now to FIG. 1, in which a planar coordinate system formed by an horizontal (X-axis) and vertical (I-axis) is presented. Curve 4, having a constant slope originates at $I(x_1)$ and terminates at $I(x_2)$. This simple curve represents the type of information provided to the system by the user on an interactive basis. In this regard, FIG. 1 represents a linear curve between two endpoints $[I(x_1)$, and $I(x_2)]$ in a X-I coordinate system. In relation to the present invention, the input mode of the system permits the user to define the parameters of curve 4 in terms of intensity endpoint values, $I(x_1)$ and $I(x_2)$, and also in defining the shape of curve 4. For example, assuming a black and white format, the system user could enter a -0- value for $I(x_1)$ (0% black) and 100% value for $I(x_2)$ (100% black). In addition, the user can select the shape of the curve between these endpoints, such as the linear relationship shown by curve 4 of FIG. 1.

Figure 2:
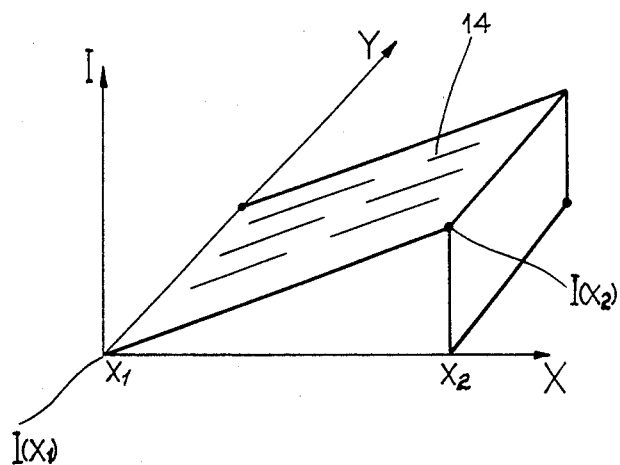
FIG. 2 provides a three-dimensional surface plot showing the relationship of color intensity (I) and horizontal position (X) and vertical position (Y).

The use of this curve in generating a degrade pattern can be more fully appreciated by referring now to FIG. 2, which presents surface 14 in the coordinate system defined by X, Y and I axes, where I is the level of color intensity and X and Y are positional variables in the image matrix. As can be seen, surface 14 is actually a plane sloping upwards to the right (or X-direction). Since the I axis represents the level of color intensity for each pixel location, it is apparent that color intensity is increasing for increasing values of X, but remains constant for changing values of Y, at the same X. In fact, this provides the basis for relating curve 4 in FIG. 1 to surface 14 in FIG. 2. In this regard, curve 4 is a vertical "slice" of surface 14 at a particular Y location. For this system, the selected Y location is defined at the "Y" endpoints in the (X, Y) image matrix (i.e., either Y=0, or Y=Ymax for that particular image resolution). The relationship between FIG. 1 and FIG. 2 is completed by assigned endpoints $I(x_1, 0)$, and $I(x_2, 0)$, as depicted on the edge of surface 14 in FIG. 2 (i.e., Y=0).

The information in surface 14 is translated to the final degrade pattern by mapping the individual intensity values, I, in surface 14, onto their respective pixel location in the (X, Y) image matrix. In this way, each pixel is assigned an (X, Y) location and an intensity value by the relationship of Equation (1), where Pel is the pixel output for a raster image and $I=I_R+I_G+I_B$ for an RGB color format (see Table 1):

$$Pel = I(X, Y) \quad (1)$$

Figure 3:
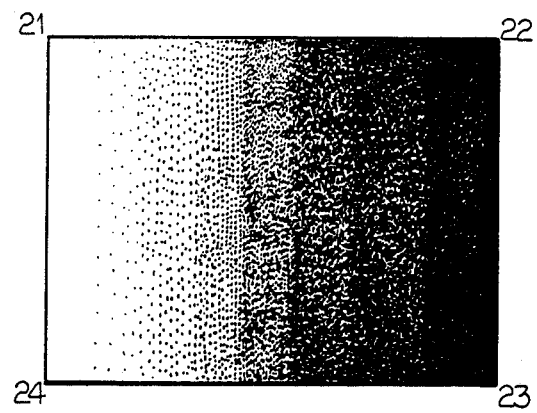
FIG. 3 is the degrade pattern that results from the user defined curve constraints illustrated in FIG. 1 and 2.

In FIG. 3, the desired degrade pattern is presented, based on the user defined curve constraints illustrated in FIG. 1. As can be seen, the degrade pattern is a uniform transition from the all-white left edge (21-24) to the all-black right edge (22-23). By means of convention, this type of degrade pattern is referred to as a "horizontal" degrade. A horizontal degrade is characterized by a horizontal transition of shading. Again, the black/white format is for illustration only and it should be realized that the same principles apply to a transition between any two defined edge colors for this system.

TABLE I

| Variables | | |
|---|---|---|
| Pel | = | pixel output |
| I | = | overall intensity |
| $I_R$ | = | red intensity |
| $I_G$ | = | green intensity |
| $I_B$ | = | blue intensity |

Figure 4A:
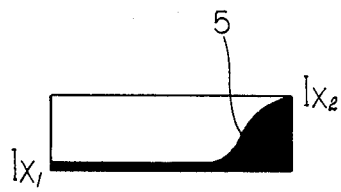
FIGS. 4A–4C provides three (3) sample degrade patterns, in association with their respective user-defined curve constraints.
Figure 4B:
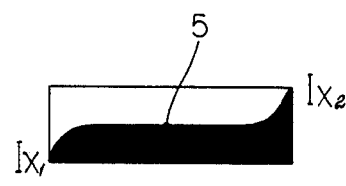
Figure 4C:
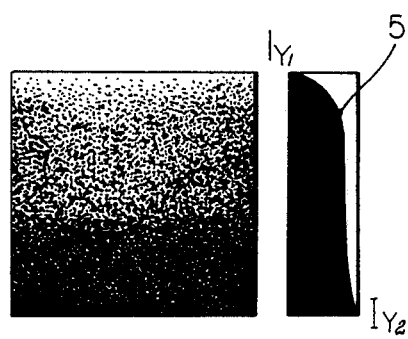

Although FIG. 1 has presented a simple linear curve for developing a final degrade pattern of uniform transition (FIG. 3), this is not a system limitation. In fact, the system provides for user controlled variation of curve 4, (in FIG. 1) in the creation of a variety of "non-uniform transition" degrade patterns. These potential variations are exemplified in the series of curves of FIG. 4 (curves A, B, & C). For each sample curve, the resulting degrade is presented directly adjacent to the curve. In addition, curve "C" of FIG. 4 provides a "vertical" degrade pattern in that the direction of transition for the degrade is vertical. As can be readily appreciated, the vertical degrade is identical to the horizontal degrade except that it has been rotated 90°.

Figure 5:
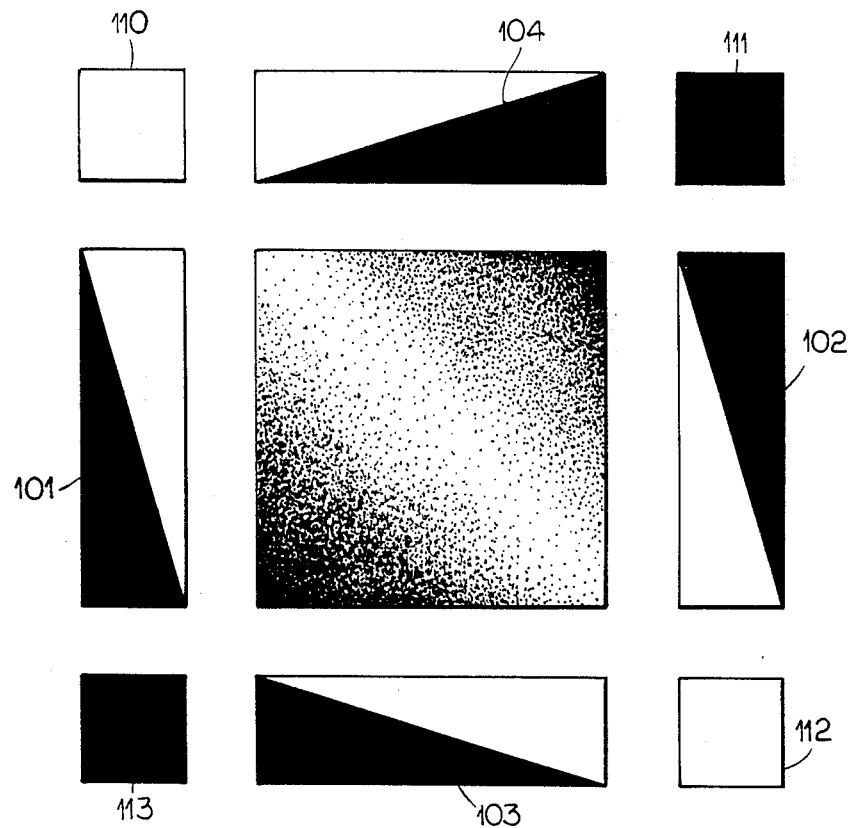
FIG. 5 provides an example of a "four point" degrade pattern in association with the four user-defined edge curves that determine the degrade pattern's properties.

The combination of horizontal and vertical degrades into a single pattern provides what is referred to as a "four point" degrade. This is graphically illustrated in FIG. 5, where horizontal curves 101 and 102 define the left and right pattern edges respectively, and curves 103 and 104 define the lower and upper edges respectively. The four curve endpoints, one at each corner of the degrade pattern, as indicated by squares 110, 111, 112 and 113 in FIG. 5, are each assigned a color intensity level. These "corner values" establish the intensity range for each interceding curve. Again, for this example, the curves in FIG. 5 are shown as all linear. The system is equally capable of employing non-linear curves in any or all four curve locations.

Finally, the system is also capable of generating circular and rectangular degrade patterns. Although these latter patterns are created from the same type of edge curve information, the underlying surface generating algorithms are distinct from the above described horizontal, vertical and four point patterns.

Figure 12A:
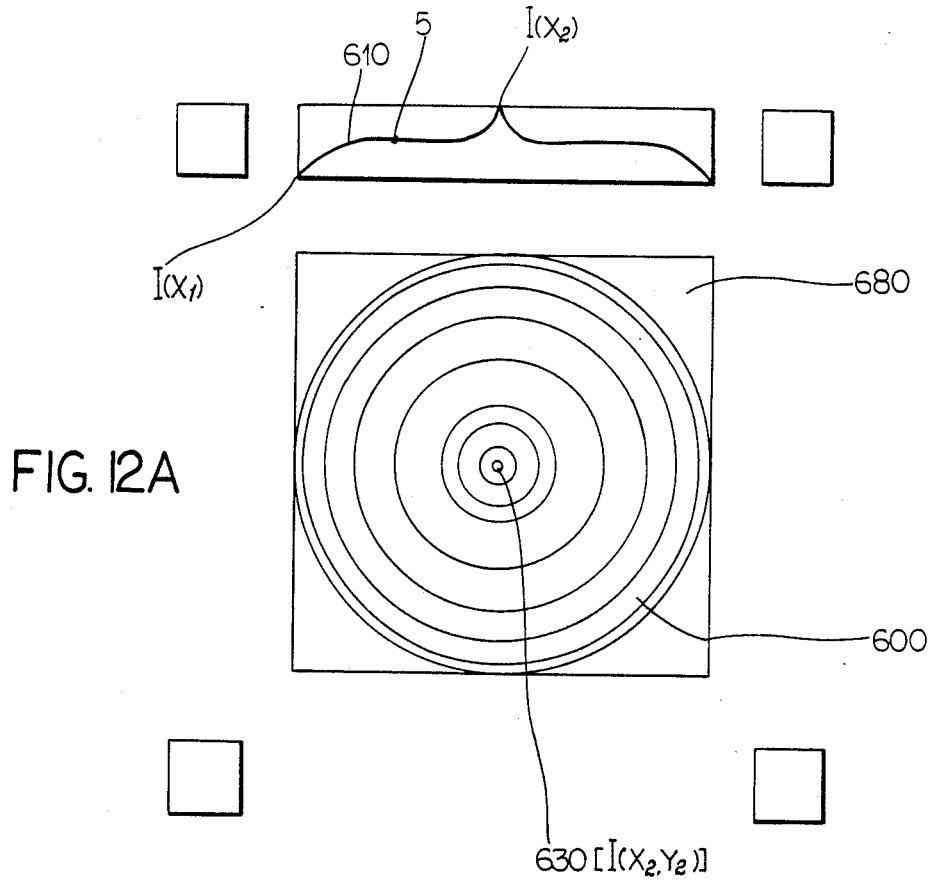
FIGS. 12A and B provides the circular degrade pattern in two and three-dimensional representations.
Figure 12B:
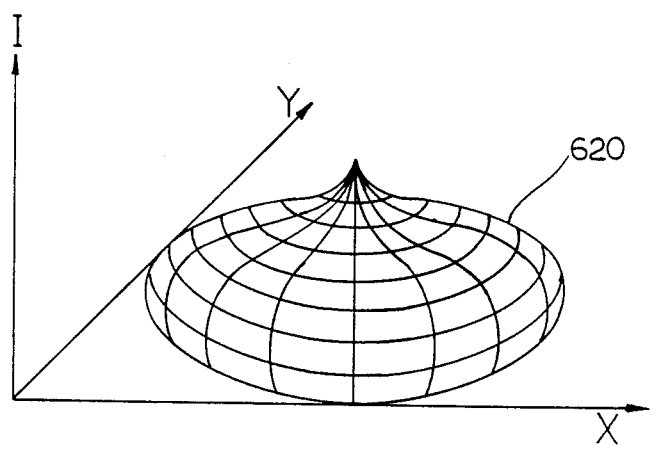
Figure 13A:
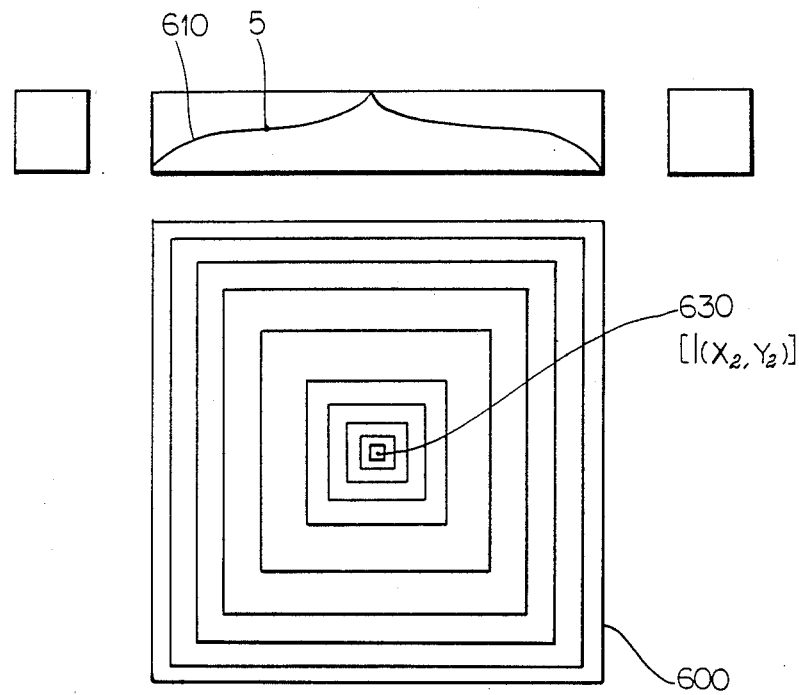
FIGS. 13A and B provides the rectangular degrade pattern in two and three-dimensional representations.
Figure 13B:
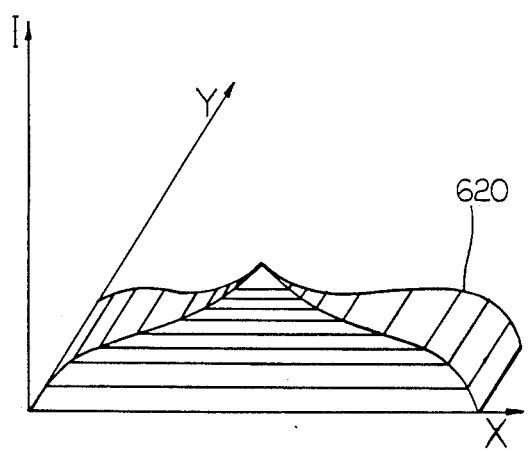

More specifically, and now referring to FIG. 12, a circular degrade is shown, first as a planar representation, 600, and then as a generated surface in the (X, Y, I) coordinate system. The planar representation forms a contour map of intensity, I, as generated by edge curve 610. In FIG. 13, a rectangle degrade is similarly shown again as both planar representation and as a surface in (X, Y, I) space. As will be explained below, the circular and rectangular pattern options permit the user to generate degrade patterns not available from the vertical, horizontal or four point pattern algorithms.

System Operation

In practice, the inventive system permits the user to define color intensity levels for the four corner values in FIG. 5. These intensity levels will be for a cyan, yellow, magenta, and black color combination (CYMB) with a 0% color intensity level assignment for default to white. Alternatively a color format based on red, green, and blue (RGB-additive color) can be used, with 0% color intensity level assignment for default to black.

Establishing the continuous relationship for the color transition between the corner values involves the setting of curve "control points". For the horizontal, vertical and four-point degrade patterns, the inventive system employs Bezier curve interpolation techniques. The shape of the Bezier curve is controlled by user-selected control Points between each pair of corner values or more typically by the position and "twist" of a single "twist point" on the curve, as is further explained below. For the horizontal and vertical cases a three-dimensional surface is adequately described by a single edge curve (FIG. 1), which is expanded to a three-dimensional prismatic solid (FIG. 2). For a four-point degrade, interior control points are calculated by a method chosen to approximate a minimal surface between the edge curves. The surface generating algorithm is based on multiple Bezier surfaces, locally joined with zero-order continuity. A complete explanation of this approach appears in *Principles of Interactive Computer Graphics*, Second Edition by William M. Newman, Robert F. Sproull, McGraw Hill 1979, 1973 ISBN 0-07-046338-7 (see pages 318–322) which is hereby incorporated herein by reference. The circular and rectangular degrade patterns employ a single edge curve via the Bezier algorithm, although the translation of the edge curve into an intensity surface proceeds by a separate mechanism.

Figure 6:
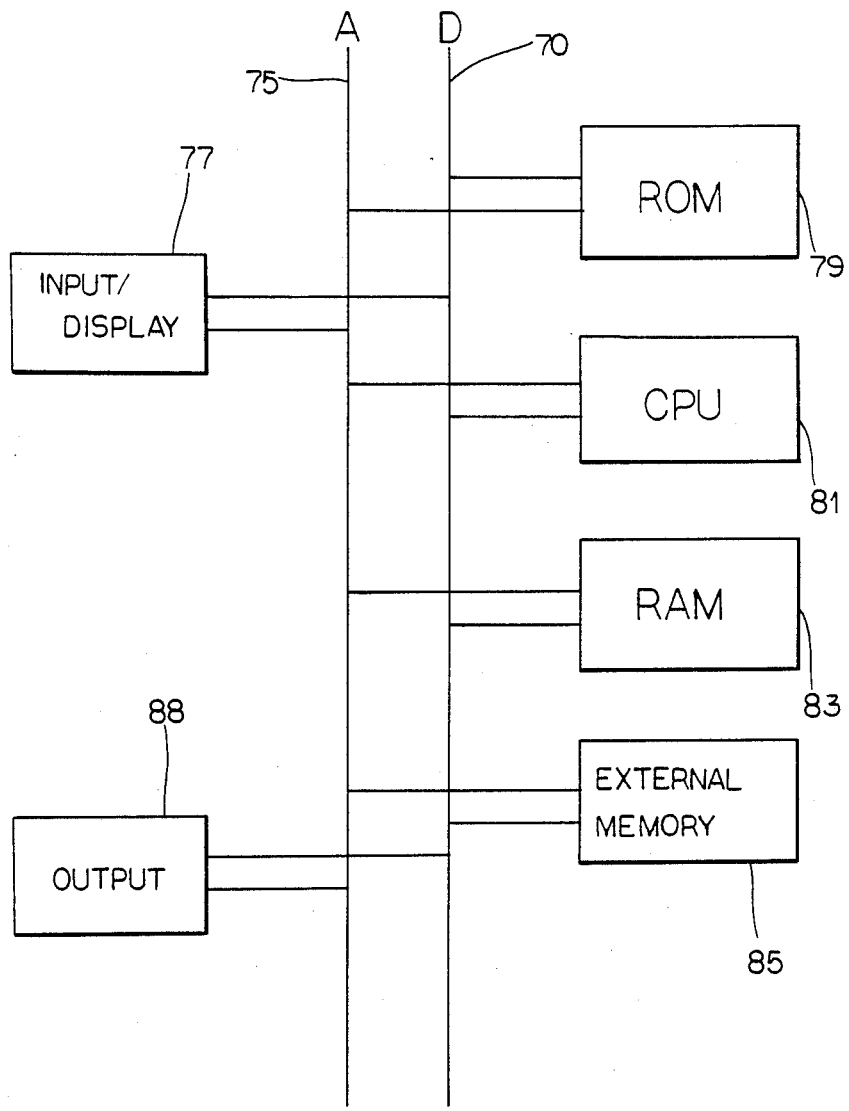
FIG. 6 is a block diagram of the system components for the present invention.

The system arrangement is diagrammed in FIG. 6, wherein system components communicate by means of data bus 70 and address bus 75. The input/display means, 77, provides the user interface for entering the curve constraint parameters into the system and observing the resulting degrade pattern based on these parameters. Ordinarily this information is placed in random access memory (RAM, block 83) and accessed by the central processing unit (CPU, block 81) to recalculate the matrix image. The system program instructions for this calculation can be permanently stored in read-only memory (ROM, block 79) or placed in the more volatile RAM storage. It should be recognized that the present system employs conventional computer hardware in terms of memory, processing and display devices. In addition, the system instructions can be programmed in any language particularly suited to the adopted hardware for implementation.

The CPU processes the entered data and generates the degrade pattern in matrix data form. This data is used to refresh the display and also can be placed into RAM storage, into an external memory device, such as magnetic tape (block 85), or directed to alternative output devices such as a printer or remote display (block 88).

Figure 7:
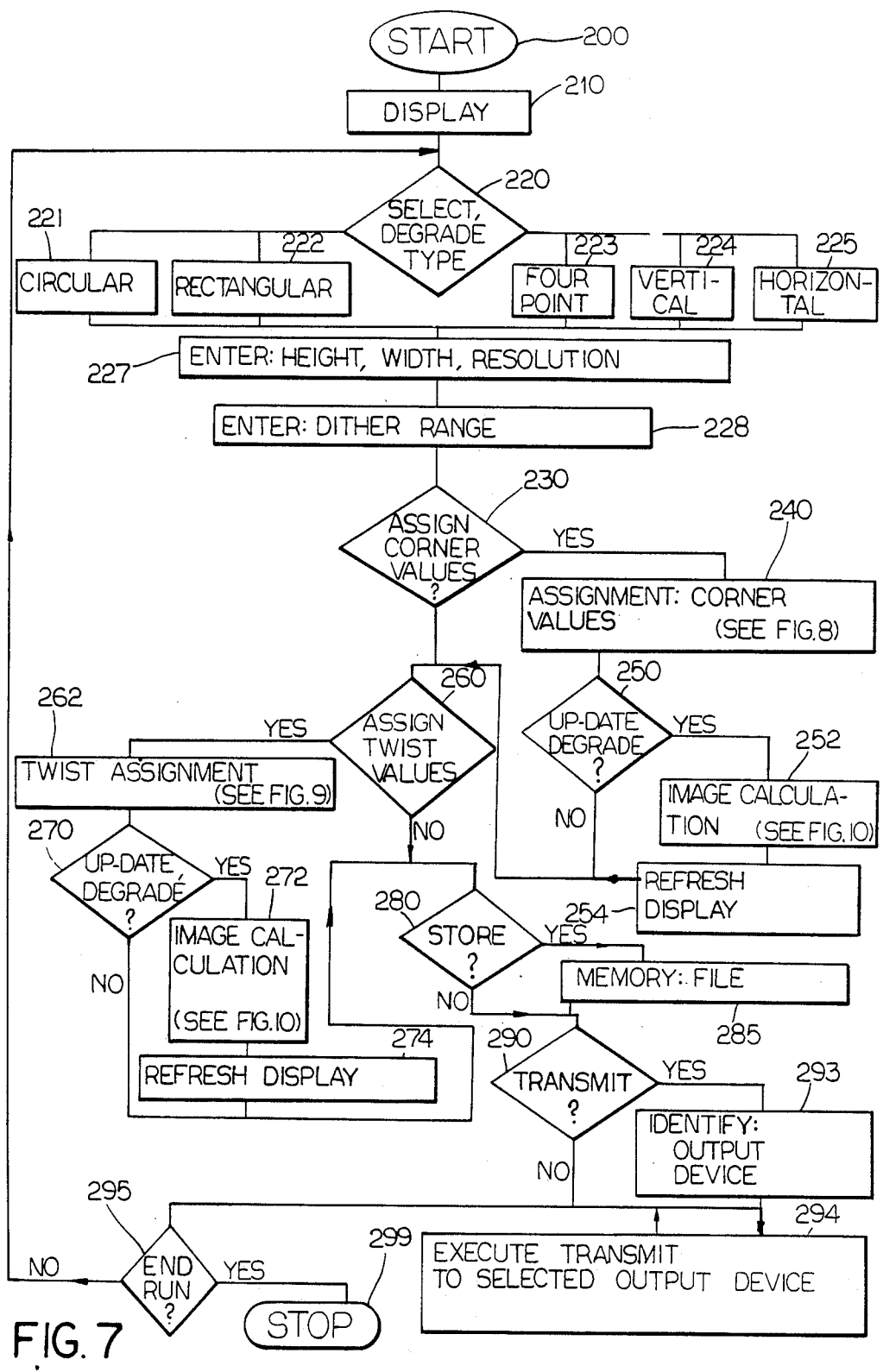
FIG. 7 provides a program flow chart for the system of the present invention.

A flow-chart for the logic path of the present system is presented in FIG. 7. System activation is indicated by block 200, "start" function. This is followed by the initial screen display (block 210) and the input phase of the system operation. The initial screen display will often present a sample degrade pattern and offer a menu driven set of user instructions. The user can select the type of degrade pattern through test 220 (i.e., select either vertical, horizontal, four-point, circular or rectangular degrade pattern). Block 227 permits the entry of selected values for height and width, which may be in any well known units such as inches or millimeters, and resolution which is expressed in pixels per unit measure. The pixel height of the image matrix is determined by the product of (height×resolution) and the pixel width is determined by the product of (width×resolution). An entered value for height greater than the entered value for width will result in a vertically elongated degrade whereas equal values for height and width will result in a square degrade. Logic then passes to block 228 wherein the user selects a "Dither Range" to control the digitizing of surface intensity values. The use of this dither range will be more fully explained below. Once the type and height/width ratio are selected, the user is requested to assign corner intensity values, test 230, for each corner required in that particular pattern. The assignment of corner values in the degrade pattern is accomplished by the subroutine indicated by block 240, and shown in FIG. 8.

Figure 8:
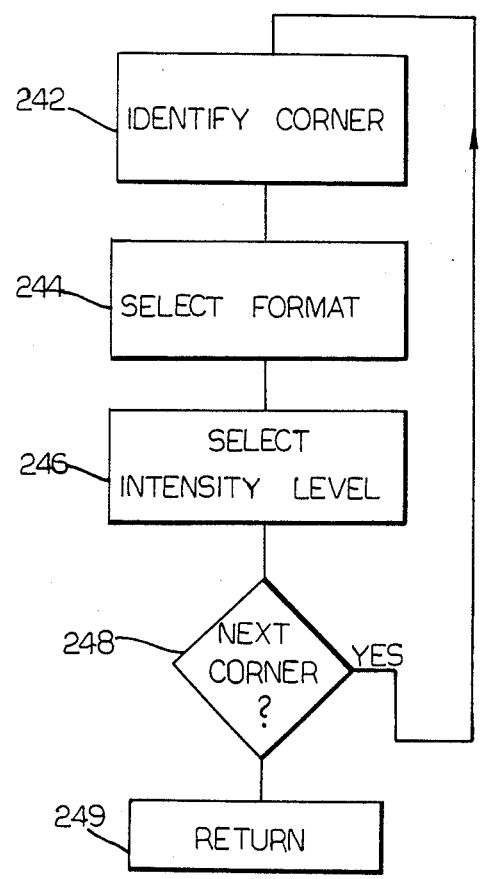
FIGS. 8, 9, and 10 provide subroutines for the flow chart of FIG. 7.

More specifically, referring now to FIG. 8, the user is requested in block 242 to identify a corner of the displayed pattern (as illustrated by corner 110 of FIG. 5). Based on the color format chosen (block 244, or by default values) the user chooses the intensity level for each color in that format, on a scale of 0 to 100% saturation (block 246). This loop proceeds for each corner in the pattern (i.e., two corners for horizontal or vertical degrades, and four corners for the "four-point" and circular degrades and three corners in the rectangular degrade). Test 248 checks to see if the user has selected color values for all corners of interest; if a positive response is indicated, the logic path returns via block 249 to the main routine (FIG. 7) terminating this subroutine. At this point, the system user can choose to recalculate the degrade image based on the newly input corner values (Test 250). If positive, the image is recalculated, block 252 (image calculation subroutine in FIG. 10, discussed below).

For the circular and rectangular patterns, the four corner color intensity values as entered are used in a slightly different manner. For the circular pattern, the upper-left corner assigns the color intensity level for the outermost circle (i.e., base of the cone as mapped into three dimensions—intensity v. planar position). The upper-right corner assigns the color intensity level to the innermost circle (i.e., top of the cone in 3-D sense). The lower-left corner assigns the color to the regions of the "square" image outside the outermost circle (i.e., 680 in FIG. 12). The lower-right corner assigns the color to the truncated top of the cone if such an option is selected.

For the rectangular pattern, the upper-left and right corners are used to assign color intensity values to the base and tip of the resulting pyramid (in 3-D space). The lower-right corner is for the color intensity assignment for the truncated top of the pyramid, if such an option is selected. After the image is recalculated (block 252), the user display is refreshed with the new pattern (block 254) and the input phase continues to the curve twist information.

In this regard, the user is queried on whether new curve twist information in the form of a "twist point" assignment is required by test 260. A positive response here shifts the program logic to the curve twist subroutine, block 262; this subroutine is Presented in FIG. 9.

Figure 9:
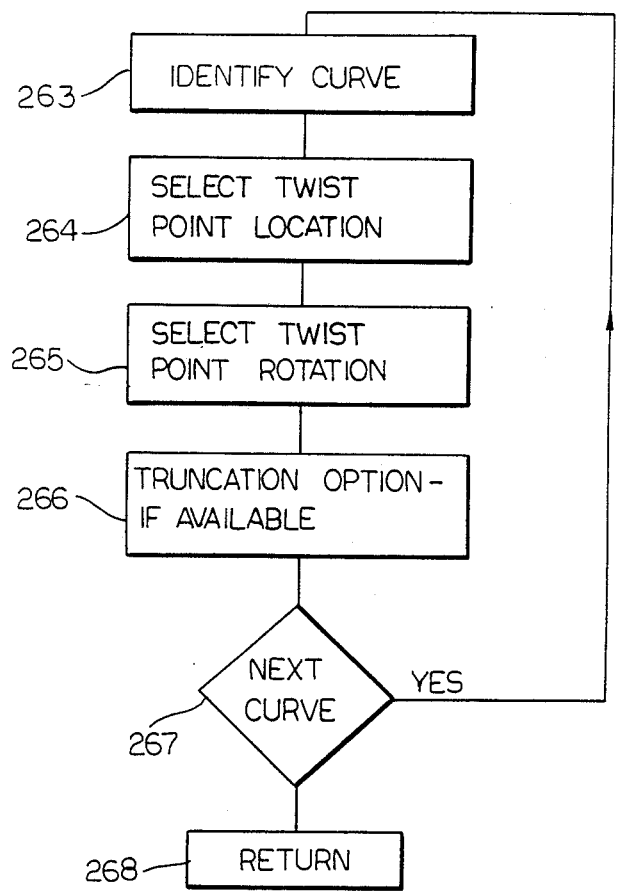

In FIG. 9, the user first identifies the curve to be modified (block 263) and then adjusts the shape of this curve through the manipulation of the "twist" point on that curve. By way of illustration, this twist point is exemplified by point 5 on curve 4 in FIG. 1, and throughout the other figures. For vertical, horizontal, circular and rectangular degrades, only one curve is used in the data entry sequence and appears on the screen. The twist point can be manipulated in two ways; the first is by means of changing the twist point location, vertically or horizontally as indicated by block 264. This movement of the twist point will evoke a corresponding shift in the curve location, as the twist point is always one of the points that make up this edge curve. The second manipulation is through the rotation of the twist point as indicated by block 265. This rotation can be in either the clockwise or counter-clockwise direction. The user-selected degree of rotation will affect the shape of the edge curve by changing the pitch or slope of the curve segments that lead into the twist point.

The twist point location and rotation are set in an iterative process for each curve required for that degrade pattern (i.e., four twist points in the four-point degrade, and a single twist point for each of the other patterns). Test 267 permits termination of this input loop, returning the logic path to the main routine (FIG. 7) completing this subroutine, block 268.

For the circular and rectangular patterns, only the top edge curve is employed for twist information input. More particularly, and now referring to FIG. 12, edge curve 610 is shown above planar representation 600. $I(x_1)$ is shown as perimeter control point and determines the intensity level for the outermost circular edge in the pattern. $I(x_2)$ is the center point (i.e., apex of the cone) in the pattern and sets the color intensity level at this coordinate position. Although pattern generation can proceed via cartesian coordinates, polar coordinates can also be used and offers some benefits in calculation efficiency.

Referring back now to edge curve 610, it is clear that only one-half the curve is utilized in image formation; the points on the curve after $I(x_2)$ are merely the mirror image of the preceding points (i.e., the reflection of curve $I(x_1)-I(x_2)$). The shape of this edge curve is set, as above, by use of twist point 5, in that point 5 can be rotated or moved horizontally or vertically in the same manner as explained above and entered via the subroutine in FIG. 9. For both the circular and rectangular patterns, a truncation option exists as is indicated by block 266 in FIG. 9. The trucation operator acts to "slice-off" a selected portion of the conical or pyramidal surface. The amount removed (or, more precisely, the central location of constant intensity, I) is set via cursor on edge curve 610. For example, if point 5 is set as the truncation point, the inner portion of the curve will be set to a constant intensity level, i.e., that level of intensity corresponding to the location of point 5 in the I-axis. Again, the system user can update the degrade pattern based on the newly added information by test 270 and the image is recalculated by block 272, (through image calculation subroutine—FIG. 10). Once the new pattern is generated, the system returns to FIG. 7 and refreshes the display to the user (block 274). This terminates the input phase of system.

The above description is based on a hierarchical input format where the curve constraint information is acquired in a pre-set sequence. This form of input was chosen merely to simplify the explanation of the system. In practice, an alternate form of input would involve the sequence-independent entry of the curve constraint information by the user, thereby allowing a more complete interactive formation of the desired pattern. For example, the user may choose to try several different colors in the same corner in sequence, with the resulting degrade pattern presented after each change. This is expedited if the user is not required to re-check all other entries in a hierarchical format. In addition, the form of input can be by per se well known means such as keystroke entry, display sensor, or position transducer (i.e., mouse device).

Figure 10:
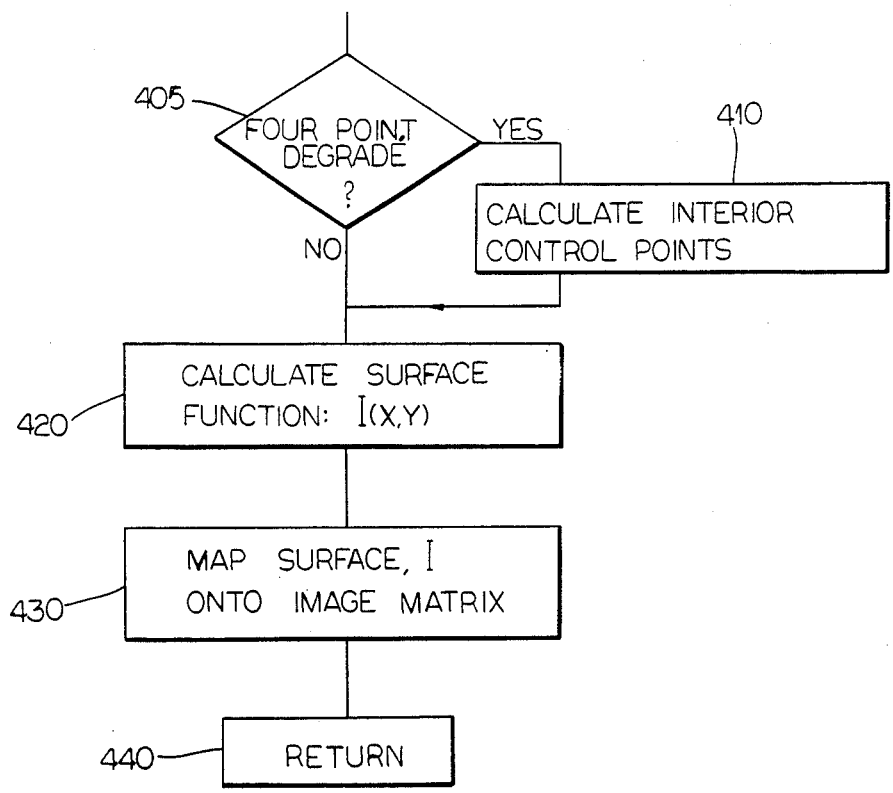

Both of the above input subroutines resulted in the recalculation of the image, by the image calculation subroutine of FIG. 10. This calculation is now more fully described.

By way of illustration, and discussing the four-point pattern first, please refer to the degrade pattern and associated edge curves shown in FIG. 5. Assuming a black/white system format, the four corners are alternatively assigned 0% and 100% black intensity by the user. These four input intensity values provide the system four "control points", one for each corner, for generating the desired degrade pattern. During the second phase of input, the user selects four twist points, in terms of location and rotation, for each one of four edge curves. Each twist point is translated by the system into two control points that are used to define the shape of the corresponding edge curve.

Figure 11A:
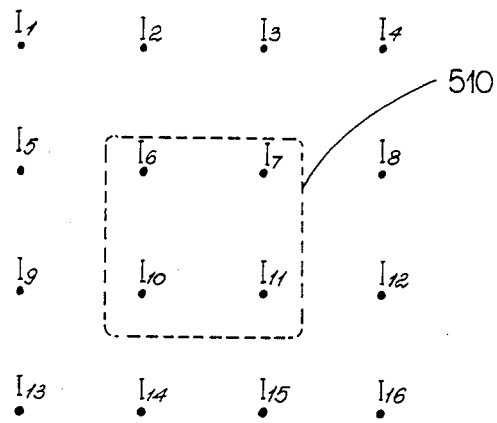
FIGS. 11A and B provides the matrix alignment for the "patch" of control points used to calculate an intensity surface, as rendered in both 2-D and 3-D space.
Figure 11B:
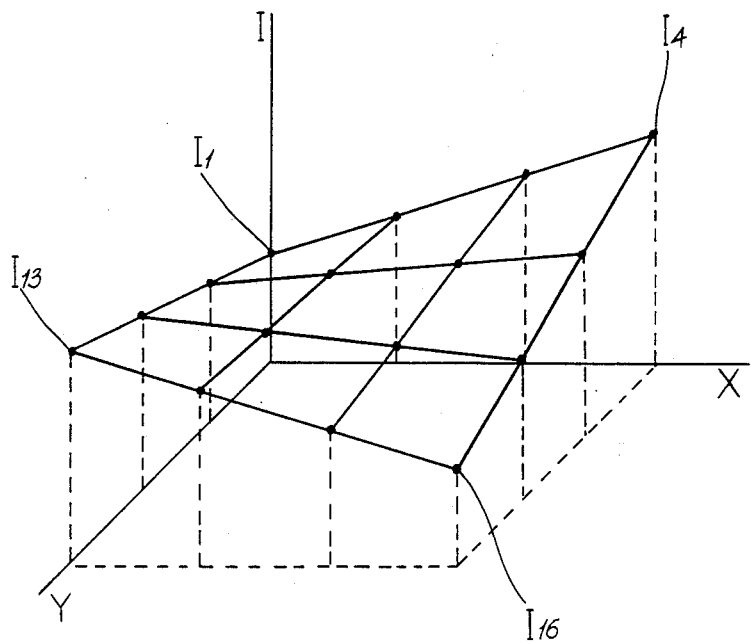

Since each twist point represents two control points on each edge curve, in conjunction with the corner intensity value control points, upon defining the four edge curves, the user generates twelve perimeter control points, in terms of intensity and position, $I(X, Y)$, (i.e., the four corner intensity values and eight edge curve intensity values). These twelve perimeter control points represent the user entered curve constraint information required by the system for generating the desired four-point degrade pattern. To generate the desired surface, four additional "interior" control points are also required. These are calculated by interpolation between the perimeter control points. To illustrate this, a matrix representation of system control points forming a surface "patch" is shown in FIG. 11. The following discussion assumes a 3×3 surface patch, comprising nine "cells" formed by 16 control points.

Table II defines the various control points from FIG. 11 in terms of shading intensity, I:

TABLE II

| Control Points | | |
|---|---|---|
| $I_1, I_4, I_{13}, I_{16}$ | = | Corner values of I |
| $I_2, I_3, I_5, I_8,$ $I_9, I_{12}, I_{14}, I_{15}$ | = | Edge curve values I |
| $I_6, I_7, I_{10}, I_{11}$ | = | Interior values of I |

As indicated, the twelve perimeter control points are entered by the system user; the four interior control points, (dotted line 510 in FIG. 11) are then calculated from the perimeter control points as follows:

For $I_6(X_6, Y_6)$: (2)
$I_6 = [\frac{2}{3} I_5 + \frac{1}{3} I_8 + \frac{2}{3} I_2 + \frac{1}{3} I_{14}]/2$
$X_6 = [\frac{2}{3} X_5 + \frac{1}{3} X_8 + \frac{2}{3} X_2 + \frac{1}{3} X_{14}]/2$
$Y_6 = [\frac{2}{3} Y_8 + \frac{1}{3} Y_8 + \frac{2}{3} Y_2 + \frac{1}{3} Y_{14}]/2$ For $I_7(X_7, Y_7)$: (3)

$I_7 = [\frac{2}{3} I_3 + \frac{1}{3} I_{15} + \frac{2}{3} I_8 + \frac{1}{3} I_5]/2$
$X_7 = [\frac{2}{3} X_3 + \frac{1}{3} X_{15} + \frac{2}{3} X_8 + \frac{1}{3} X_5]/2$
$Y_7 = [\frac{2}{3} Y_3 + \frac{1}{3} Y_{15} + \frac{2}{3} Y_8 + \frac{1}{3} Y_5]/2$ For $I_{10}(X_{10}, Y_{10})$: (4)

-continued $$I_{10} = [\tfrac{8}{8} I_9 + \tfrac{1}{8} I_{12} + \tfrac{3}{8} I_{14} + \tfrac{1}{8} I_2]/2$$
$$X_{10} = [\tfrac{3}{8} X_9 + \tfrac{1}{8} X_{12} + \tfrac{3}{8} X_{14} + \tfrac{1}{8} X_2]/2$$
$$Y_{10} = [\tfrac{3}{8} Y_9 + \tfrac{1}{8} Y_{12} + \tfrac{3}{8} Y_{14} + \tfrac{1}{8} Y_2]/2$$

For $I_{11}(X_{11}, Y_{11})$: (5)

$$I_{11} = [\tfrac{3}{8} I_{15} + \tfrac{1}{8} I_3 + \tfrac{3}{8} I_{12} + \tfrac{1}{8} I_9]/2$$
$$X_{11} = [\tfrac{3}{8} X_{15} + \tfrac{1}{8} X_3 + \tfrac{3}{8} X_{12} + \tfrac{1}{8} X_9]/2$$
$$Y_{11} = [\tfrac{3}{8} Y_{15} + \tfrac{1}{8} Y_3 + \tfrac{3}{8} Y_{12} + \tfrac{1}{8} Y_9]/2$$

Now referring to FIG. 10, and discussing the four-point degrade, the calculation of the new degrade pattern via this subroutine is described, based on the most recently entered perimeter control points. These perimeter control points are augmented by system generated interior control points. This process is represented by Block 410 and involves the above described interpolation between the perimeter control points to estimate a minimal surface between the edge curves.

After the interior control points are set, the system Proceeds to block 420 (of FIG. 10) and calculates the surface, based on the sixteen control points of the surface patch. Surface blending functions B(X) and B(Y) in terms of the X, Y coordinate system are applied via equation (6);

$$I = f(X,Y) = \sum_{i=0}^{n} \sum_{j=0}^{m} P_j\, B_{i,n}(X)\, B_{j,m}(Y) \qquad (6)$$

Where n=m=3. A complete description of the operation of this blending surface function is found in *Principles of Interactive Computer Graphics*, referenced above.

Once the surface is calculated, the system maps each pixel Intensity value, I, onto its corresponding (X, Y) location in the image matrix (block 430). I values in floating point notation are given an integer value ranging on a 0 to 255 scale (i.e., an eight bit representation of color intensity). A dithered output is used to truncate fractional I values. For example, for I=124.3 from the surface function, the system will truncate I to: I=124, 7 out of 10 times, and I=125, 3 out of 10 times. The dithered output is further modified by a "dither range" value. In the above example, a range of "1" is used. A range of "10" would result in the output ranging from 114 to 135 but with the probabilistic average remaining at 124.3. This dithered output acts to suppress visible mach bands and other artifacts in the output image. Once the matrix image array has been calculated, the subroutine ends, and logic returns to the point of departure from FIG. 7.

When operating in a multi-color mode, intensity surfaces for each color are calculated by equation (6), providing a matrix array for Red; $I_R$ (X, Y), Green; $I_G$ (X, Y) and Blue; $I_B$ (X, Y) for a RGB color system output.

For the vertical and horizontal degrades, the single edge curve is extended to form the desired intensity surface vis-a-vis a constant translation of the edge curve into the X or Y direction, respectively (see e.g., FIG. 1 and 2).

When the circular or rectangular pattern has been selected, the logic path also proceeds through the subroutine in FIG. 10 without the need to calculate interior control points (block 410). The surface generation function is calculated in block 420. For the circular pattern, this function can be in either polar or cartesian coordinates. In polar coordinates the surface is generated by rotating edge curve 610 about an axis defined by centerpoint 630. In cartesian coordinates, the distance (d) between the centerpoint (X2, Y2) and each pixel location (X, Y) is determined by equation (7):

$$d = ((X_2 - X)^2 + (Y_2 - Y)^2)^{\tfrac{1}{2}} \qquad (7)$$

The value for (d) is then used to determine the intensity, I(X, Y) from the edge curve. More particularly, I(X, Y)=I(X2−d). The method is iteratively adopted for each I(X, Y) value in the image matrix.

For the rectangular pattern, the surface function is based on a comparative analysis. In this case, d is calculated by taking the greater of the absolute value (i.e., ABS) of $D_y$ and $D_x$ as follows:

$$D_x = ABS\,(x2 - x) \qquad (8)$$

$$D_y = ABS\,(y2 - y) \qquad (9)$$

As above, the I(X, Y) is set equal to I(X2−d) wherein d is the greater of either $D_x$ or $D_y$. This method is iteratively applied for each X, Y value in the matrix, thus generating a complete I(X, Y) map of intensity.

The mapping of the intensity values pursuant to the surface equation completes the degrade formation as a continuous tone image. The resulting degrade can now be stored in computer memory in either Random Access Memory (RAM), or a magnetic storage medium, (block 280), or transmitted (block 290) to a suitable output device, such as an impact or thermal printer or remote display (block 293).

Termination of the run is indicated by block 295; if desired, a second run can be selected, either to adjust the pattern or work on a new pattern.

The descriptions provided above are for illustrative Purposes only. Variations and modifications of the present invention may be made by those skilled in the art without departing from the spirit and scope of the invention.

I claim:

1. In combination in a system for generating a smooth shaded continuous tone image comprising; input means for entering user selected perimeter constraint information comprising curve shape and color data, data processing means for determining a surface map of Intensity, I (X, Y), based on said perimeter constraint information, and further generating the continuous tone image as a two-dimensional matrix of image pixels each pixel characterized by an intensity level derived from said surface map, with position defined by matrix coordinates in the continuous tone image, iterative review means permitting modification of said perimeter constraint information in developing the smooth shaded continuous tone image and memory means for storing the continuous tone image.

2. The system of claim 1, wherein said curve constraint information comprises up to four edge curves having variable intensity values for each curve endpoint and having variable location and intensity values for at least two control points for each edge curve.

3. The system of claim 1, wherein the data processing means determines a color intensity surface for each color as selected and entered as part of the curve constraint information.

4. The system of claim 3, further comprising an output means for display of the generated smooth shaded continuous tone image.

5. In combination in a system for the generation of a smooth shaded continuous tone image represented by a two-dimensional image matrix wherein each matrix element is characterized by an image intensity level and a matrix position, I(X, Y) comprising; interactive input means for entering matrix control points in terms of intensity values, I; data processing means for calculating a surface as a function of said control points and further to generate a two-dimensional image matrix of intensity as a digital representation of said surface, iterative review means permitting modification of said perimeter constraint information in developing the smooth shaded continuous tone image and a data output means for transmitting the image matrix to an output device.

6. The system of claim 5, wherein said digital representation employs a dithered output of the surface.

7. The system of claim 5, further comprising a display terminal as said output device.

8. The system of claim 5, further comprising a printer as said output device.

9. The system of claim 5, further comprising a memory means for retaining said image matrix.

10. The system of claim 5, wherein the data processing means comprises a program controlled digital computer.

11. The system of claim 5 further comprising data processing means for generating a conical surface and means for generating said two-dimensional image matrix from said conical surface.

12. The system of claim 11, further comprising data processing means for generating a pyramidal surface and means for generating said two-dimensional image matrix from said pyramidal surface.

13. In combination in a program controlled smooth shaded image generating apparatus comprising input-/output means to provide interactive entry of curve constraint data and display of a resulting smooth shaded image, data processing means for generating said smooth shaded image based on said curve constraint data, wherein said image is represented by an image array of local shading intensity values derived from a control point generated surface function relating image intensity, I to position in terms of position coordinates (X, Y), iterative review means permitting modification of said perimeter constraint information in developing the smooth shaded continuous tone image, memory means for retaining said smooth shaded image as a matrix image array, and output means for transmitting said matrix image array to an output device.

14. The apparatus of claim 13, wherein input/output means comprises a keyboard and display terminal.

15. The apparatus of claim 14, wherein input/output means further comprises a position transducer.

16. The apparatus of claim 14, wherein the output means transmit instructions to a device capable of generating separation films for use in a pre-press system.

* * * * *